US008649630B2

(12) United States Patent
Liu

(10) Patent No.: US 8,649,630 B2
(45) Date of Patent: Feb. 11, 2014

(54) METHOD AND APPARATUS FOR PROCESSING DISTORTED IMAGE

(75) Inventor: Zhuan Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/382,750

(22) PCT Filed: Nov. 30, 2010

(86) PCT No.: PCT/CN2010/079275
§ 371 (c)(1),
(2), (4) Date: Jan. 6, 2012

(87) PCT Pub. No.: WO2012/027931
PCT Pub. Date: Mar. 8, 2012

(65) Prior Publication Data
US 2013/0156325 A1    Jun. 20, 2013

(30) Foreign Application Priority Data

Aug. 30, 2010    (CN) .......................... 2010 1 0268278

(51) Int. Cl.
*G06K 9/40*    (2006.01)

(52) U.S. Cl.
USPC ........................................................ 382/275

(58) Field of Classification Search
USPC .................. 382/254, 255, 268, 275, 276, 282
See application file for complete search history.

(56) References Cited

U.S. PATENT DOCUMENTS

| 6,101,288 A * | 8/2000 | Kang ............................ 382/276 |
| 6,791,616 B2 * | 9/2004 | Tamaki et al. ................ 348/335 |
| 7,352,914 B2 * | 4/2008 | Tapson .......................... 382/275 |
| 7,365,326 B2 * | 4/2008 | Wood ............................ 250/332 |
| 2007/0206159 A1 | 9/2007 | Itaki |

FOREIGN PATENT DOCUMENTS

CN    1735837 A    2/2006

OTHER PUBLICATIONS

Computer English Translation of Chinese Patent No. CN 1735837 A, pp. 1-21.*
International Search Report for PCT/CN2010/079275 dated May 10, 2011.

* cited by examiner

*Primary Examiner* — Daniel Mariam
(74) *Attorney, Agent, or Firm* — Ling Wu; Stephen Yang; Ling and Yang Intellectual Property

(57) ABSTRACT

The method and apparatus for processing distorted image is provided by the present invention, and the distortion parameter of the distorted image is obtained after a terminal implements the image conversion processing for an obtained distorted image; the terminal implements recovery processing for the distorted image based on the distortion parameter. The method and apparatus of the present invention could ensure that the terminal recovers a distorted image to a clear image quickly and accurately, improving the user's experience.

6 Claims, 2 Drawing Sheets

METHOD AND APPARATUS FOR PROCESSING DISTORTED IMAGE

TECHNICAL FIELD

The present invention relates to image processing technology field, and specifically relates to a method and an apparatus for processing distorted image.

BACKGROUND OF THE RELATED ART

With the camera and the terminal like mobile phone with function of camera and mobile internet devices (MID) coming into people's lives quickly, photographing becomes an important part of the daily life.

When photographing using a terminal, the photographed image may be obscure because of the hand jitter or movement of the object and so on, that is to say, the condition of image distortion appears.

While the image distortion is solved in the prior art, the camera structure using the combination of sensor and scrolling type shutter is mainly used to be applied in the process of obtaining the image for processing. For example, the displacement sensor attached to a camera device is used to carry out the estimation of movement parameters, and trace the displacement of the scene in the view of the image sensor, and the used image sensor could rotate relative to the camera body, so that the scanning function component in the terminal is supported to adjust the scanning direction based on the detected displacement. Alternatively, an enhanced image is created by several continuous exposures, and all of the photosensitive sensors are exposed at the same time during each exposure, and all of the exposures in that series are combined to form a whole image. However, there is still a phenomenon of image distortion with different degrees existing in the present technology such as movement compensation that are used for preventing the movement distortion in the process of obtaining images, leading to the decrease of the experience of the users.

SUMMARY OF THE INVENTION

The problem to be solved by the present invention is to provide a method and an apparatus for processing distorted image, thereby ensuring that the distorted image is recovered to the clear image by the terminal.

In order to solve the above-mentioned problem, the scheme provided by the present invention is as follows:

A method for processing distorted image, the method comprises:

after a terminal performs image conversion processing for obtained distorted image, obtaining a distortion parameter of the distorted image;

the terminal performing recovery processing for the distorted image based on the distortion parameter.

The terminal performing the image conversion processing for the obtained distorted image comprises:

the terminal performing the image conversion processing for a selected partial area of the distorted image.

Obtaining the distortion parameter of the distorted image after the terminal performs the image conversion processing for the obtained distorted image comprises:

the terminal converting the obtained distorted image to a corresponding spectrum domain image;

the terminal obtaining the distortion parameter based on the spectrum domain image.

Obtaining the distortion parameter of the distorted image after the terminal performs the image conversion processing for the obtained distorted image comprises:

the terminal converting the obtained distorted image to a corresponding cepstrum domain image;

the terminal obtaining the distortion parameter based on the cepstrum domain image.

The terminal converting the distorted image to the corresponding cepstrum domain image comprises:

the terminal performing Fourier transform for a distorted image $g(x, y)$, and obtaining a spectrum domain image $G(u, v)$ corresponding to the distorted image $g(x, y)$;

the terminal performing transformation on the $G(u, v)$ by using a transformation formula $G\%(u, v)=|\log(1+|G(u, v)|)|^2$;

the terminal performing a two-dimension Inverse Fourier transform for the $G\%(u, v)$ to obtain a cepstrum domain image $Cep(g(x, y))$ corresponding to the distorted image $g(x, y)$.

The terminal obtaining the distortion parameter based on the cepstrum domain image comprises:

the terminal extracting an edge image of the cepstrum domain image to obtain a binary image;

the terminal performing a Hough transform for the binary image to obtain an accumulation array $A(\rho, \theta)$, a formula of the Hough transform being $\rho = x_0 \cos\theta + y_0 \sin\theta = A\sin(\alpha+\theta)$; wherein $x_0$ and $y_0$ are coordinate parameters of pixels in the binary image;

the terminal determining an angle $\theta$ component corresponding to the accumulation array $A(\rho, \theta)$ with a maximum value as a distortion angle in the distortion parameters.

The terminal obtaining the distortion parameter based on the cepstrum domain image comprises:

the terminal rotating the cepstrum domain image by a negative distortion angle in the distortion parameters to obtain a two-dimension image matrix;

the terminal averaging the two-dimension image matrix by column to obtain a row vector;

the terminal determining a position of a first negative value of real part of the row vector in the vector as a distortion length in the distortion parameters.

An apparatus for processing distorted image, the apparatus comprises:

an obtaining module, configured to obtain a distortion parameter of the distorted image after performing image conversion processing for obtained distorted image;

a recovery module, configured to perform recovery processing for the distorted image based on the distortion parameter.

The obtaining module comprises:

a conversion unit, configured to perform the image conversion processing for the distorted image, and the image conversion processing comprising converting the distorted image to a corresponding spectrum domain image or a corresponding cepstrum domain image;

a parameter obtaining unit, configured to obtain the distortion parameter from a corresponding image converted by the conversion unit.

The obtaining module includes:

a selecting unit, configured to select a portion of the distorted image, so that the obtaining module performs the image conversion processing for the selected portion of the distorted image, and then obtain the distortion parameter of the distorted image.

It can be seen from the above description that the method and apparatus for processing the distorted image provided by the present invention obtains the distortion parameter of the distorted image after performing the image conversion processing for the obtained distorted image by way of the terminal; the terminal performs the recovery processing for the distorted image based on the distortion parameter. Thereby the distorted image is ensured to be recovered by the terminal to a clear image quickly and accurately so as to improve the experience of users.

PREFERRED EMBODIMENTS OF THE PRESENT INVENTION

Figure 1:
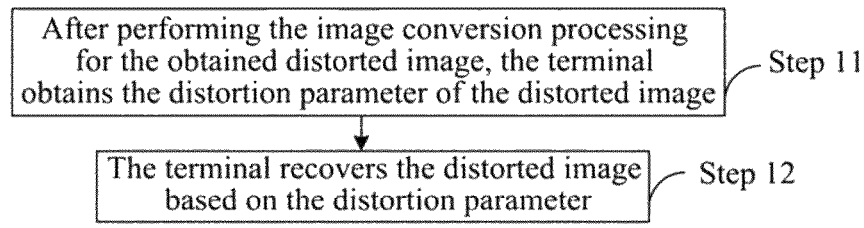
FIG. 1 is a schematic flowchart 1 of method for processing the distorted image provided by the embodiments of the present invention.

As shown in FIG. 1, the method for processing the distorted image provided by the embodiments of the present invention specifically comprising the following steps:

Step 11, after performing the image conversion processing for the obtained distorted image, a terminal obtains the distortion parameter of the distorted image;

Step 12, the terminal performs the recovery processing for the distorted image based on the distortion parameter.

Thereby, the terminal with camera function may recover the distorted image to a clear image quickly and accurately, improving the experience of the user.

For the sake of understanding the embodiments of the present invention, the building process of the image distortion model is described as follows:

Assuming a clear scene image is $f(x, y)$, the total exposure time is T, $x_0(t)$, $y_0(t)$ represent displacements of the pixel of image in the horizontal x direction and vertical Y direction at time t (t is included in T) respectively, the random noise added by system is n(x, y), the expression in time domain form of the distorted image g(x, y) may be:

$$g(x, y) = \sum_{i=0}^{M-1} \sum_{j=0}^{N-1} h(x-i, y-j) f(x, y) + n(x, y) =$$

$$\int_0^T f[x - x_0(t), y - y_0(t)] dt + n(x, y);$$

Wherein the parameters M and N may represent the range parameter of the distorted image, and i and j may represent the position parameter of the pixel in the image matrix.

It can be seen from the above expression that, the distorted image g(x, y) is the integral of the image $f(x, y)$ and time, and the random noise is added to it. The Fourier transform is carried out for the above expression, and it is transformed by using the Euler's formula and trigonometric function transformation formula, and then a frequency domain expression of a point-spread function (PSF) that causes the distortion of the image is obtained as follows:

$$H(u, v) = \frac{\sin \pi 1 L}{\pi 1 L} e^{-j\pi 1 L}, \tag{1}$$

wherein $$1 = u \cos\theta + v \sin\theta$$

In the above expression, parameters u and v are the position parameters of the distorted image g(x, y) in the corresponding spectrum domain image G(u, v).

It can be seen from the above expression, the point-spread function causing the distortion of the image may include two important parameters, one of which is distortion angle θ, and in the embodiment of the present invention, take the horizontal rightward direction as the beginning; and the other is the distortion length L, which represents the track range of the distortion of one pixel with the displacement. So the distorted image may be recovered by using various methods for image recovery after the estimation of the above two parameters.

It can be discovered by analyzing the characteristics of spectrum domain image obtained by performing the Fourier transform for the distorted image that there are obvious mutually parallel dim lines with equal space existing in the plane of the spectrum domain image corresponding to the distorted image, and the direction of the dim lines is perpendicular to the distortion direction of the image, and these straight lines with equal space may reflect the distortion length L. The distortion angle θ can be concluded from the direction of the straight line. Therefore, the estimation of the distortion parameter may be carried out based on the spectrum domain image corresponding to the distorted image.

In the normal circumstance, when the distortion angle θ=0, the magnitude of H(u, v) may be:

$$|H(u, v)| = \left| \frac{\sin(\pi u L)}{\pi u L} \right|;$$

Wherein, $$\frac{\sin(\pi u L)}{\pi u L}$$

is a normalization sinc function in the digital signal processing and theory of communication field, and the magnitude of the $$\frac{\sin(\pi u L)}{\pi u L}$$

is zero periodically when $$u = \pm \frac{1}{L}, \pm \frac{2}{L}, \ldots .$$

When noise is eliminated, according to G(u, v)=F(u, v)H(u, v) (F(u, v) is a expression in the frequency domain form corresponding to the original image $f(x, y)$), the G(u, v) in the corresponding position is also zero. Therefore in an alternative embodiment of the present invention, the distortion length L may be estimated according to the coordinate parameter u of the first zero point of G(u, v).

In one preferred embodiment of method for processing the distorted image provided by embodiment of the present invention, the estimation of the distortion parameter may also be carried out in the cepstrum domain image corresponding to the distorted image. Thereby the case of greater error existing between the estimated value and actual value probably caused by the noise interference or greater distortion scope may be avoided, when the estimation of distortion length L is carried out in the spectrum domain image G(u, v).

The existing calculation formula for converting the distorted image g(x, y) to the cepstrum domain may be:

$$Cep(g(x,y)) = invfft\{\log(|fft\{g(x,y)\}|)\};$$

That is to say, it may be obtained by performing the inverse Fourier transform for the logarithm power spectrum of the distorted image g(x, y).

In the embodiment of the present invention, to avoid the case that the valid image may not be obtained by existing formula, the existing formula and portion of definitions are transformed specifically as follows:

Assuming that G(u, v) is the spectrum domain image corresponding to the distorted image g(x, y), and G(u, v) is transformed as:

$$G\%(u,v) = |\log(1+|G(u,v)|)|^2;$$

The cepstrum domain image corresponding to the distorted image g(x, y) provided by the embodiment of the present invention may be obtained by performing a two-dimension Inverse Fourier Transform for G %(u, v)

The specific calculation formula may be as the following:

$$Cep(g(x, y)) = \frac{1}{4\pi^2} \int_{-\pi}^{\pi} \int_{-\pi}^{\pi} |G\%(u, v)| e^{j2\pi(ux+vy)} du\, dv$$

After converting the spectrum domain image to the cepstrum domain image, the distortion angle θ may be calculated from the direction of fitting a straight line in the cepstrum domain image from the dim lines of the spectrum domain image; the distortion length L may be calculated from the subscript parameter of the zero-crossing point value of Cep (g(x, y))

In one preferred specific embodiment of the present invention, the specific process of calculating the distortion angle θ may includes:

An accumulation array A(ρ,θ) is obtained by performing the Hough transform for the edge image extracted from the cepstrum domain image, that is the binary image BW, and the maximum value of the accumulation array A(ρ,θ) is found out and the corresponding θ component is the distortion angle θ of the distorted image g(x, y).

The Hough transform is initially proposed in the field of image edge detection, and after the set of boundary points is found out, they are connected to form an entire boundary graphic description. What the Hough realizes is a mapping relation from the image space to the parameter space, the basic idea of which is:

1. For any straight line Y=ax+b in the plane xy of a rectangle coordinate, there is one corresponding point in the parameter plane ab;

2. All of the straight lines crossing the point (x, y) in the plane xy form one straight line in the parameter plane ab;

3. If the point $(x_1, y_1)$ and the point $(x_2, y_2)$ are collinear, there is one intersection point of the straight lines formed by these two points in the parameter plane ab;

4. The straight line in plane xy, corresponding to the point that the most lines in the parameter plane ab cross at, is the required solution.

During the realizing of the algorithm, considering the value of a of the straight line in the vertical direction in the parameter plane ab is infinite, so another type of parameter form is applied, that is x cos θ+y sin θ=ρ, thereby the transformation formula for the point $(x_0, y_0)$ in the plane xy is:

$$\rho = x_0 \cos\theta + y_0 \sin\theta = A\sin(\alpha+\theta);$$

Thereby, to detect the straight line in the image, a two-dimension accumulation array A could be built, the element of which is A(ρ,θ), and for each target point $(x_0, y_0)$ in the binary image, θ changes in turn and ρ is calculated according to $\rho = x_0 \cos\theta + y_0 \sin\theta = A\sin(\alpha+\theta)$, and A is accumulated as: A(ρ,θ)=A(ρ,θ)+1. After the completion of calculating all of the target points, the point which has the maximum value in the accumulation array corresponds to the parameter of the straight line. Therefore, the issue of straight line detection is converted to the issue of point detection in the parameter space by the Hough transform, and the task of detection is finished by the simple accumulation statistics in the parameter space.

In one preferred specific embodiment of the present invention, the process of obtaining the distortion length L by calculation from the subscript of the zero-crossing point value of Cep(g(x, y)) is as follows:

A matrix H is obtained by rotating the cepstrum domain image cep(G(u, v)) by −θ degrees (θ may be an estimated distortion angle), and at this time the distortion direction of the distorted image becomes the horizontal direction; one row vector avg[ ] is obtained by averaging H by column, then the two-dimension data is transformed to one-dimension data, and the position of the first negative value of the real part of avg[ ] in the vector is determined as the distortion length L.

In the embodiment of the present invention, the obtained distortion parameter is brought into formula (1) after obtaining the distortion parameter, and the result is a frequency domain expression of the point spread function:

$$H(u, v) = \frac{\sin\pi 1 L}{\pi 1 L} e^{-j\pi 1 L};$$

Then a time domain expression of the point spread function is obtained by an Inverse Fourier transform. And then the distorted image may be recovered by multiple methods.

In one preferred embodiment of the present invention, the distorted image may be recovered by Lucy-Richardson method. It is because that the Lucy-Richardson recovery method is also used to perform the valid recovery of the distorted image when the point spread function is known but the noise information of the image is unknown. The optimal estimation criterion of the Lucy-Richardson recovery method is the maximum-likelihood criterion, that is to say, to make the probability density function $p(g/\hat{f}\hat{f})$ maximum, and the iteration formula is:

$$\hat{f}_{k+1}(x, y) = \hat{f}_k(x, y)\left[h(-x, -y) * \frac{g(x, y)}{h(x, y) * \hat{f}_k(x, y)}\right] \quad (2)$$

Wherein, h(x, y) is the time domain expression of the point spread function.

When the iteration of the above equation converges, the result of the maximum-likelihood function of the equation model may be satisfactory.

The specific recovery steps of the embodiment of the present invention may be:

Step one, conclude a point spread function according to the obtained distortion parameter;

Step two, bring the time domain expression of the point spread function into the formula (2);

Step three, let $f_k = g$, i=1, and determine iteration times M, wherein $f_k$ is the recovered image, g (x, y) is the distortion image and i is the present distortion times.

Additionally, in one preferred embodiment of the present invention, the number of iteration times M may be 200;

Step four, implement the fixed point iteration, and judge whether the present iteration times i is equal to or less than the determined iteration times M, and if yes, re-execute the step four, and execute the iteration again according to formula (2), and add i by one; or else, proceed to step five;

Step five, output the recovered image $f(x, y) = \hat{f}_{k+1}(x, y)$.

By executing the above-mentioned method for processing the distorted image provided by the embodiment of the present invention, it can be ensured that the terminal recovers a distorted image to a clear image quickly and accurately, thereby improving the user's experience.

With the daily increasing pixels of the camera configured in the terminal, the amount of the data of obtained three-dimension image is daily increasing, for example a camera with 3.2 million pixels may reach to the resolution of 2048 pixels by 1536 pixels when obtaining an image, and the size of the image file is up to 3M, which proposes a higher requirement for the calculation processing ability of the hardware of a terminal. In fact, the movement distortion operator caused by the jitter of hand is the consistent distortion of the whole image, therefore in one preferred embodiment of the present invention, the distortion parameter may be estimated by selecting only a portion of the distorted image, which not only won't bring any negative effect on the estimation of the distortion parameter, but also decrease the amount of data needed to be processed, and make the terminal be able to obtain the more accurate distortion parameter and accelerate the responding rate of the terminal which brings user better experience. For example, in the embodiment of the present invention, the small window portion of the distorted image with 256 pixels by 256 pixels may be used to estimate the distortion parameter. The process of selecting a portion of distorted image involved in the embodiment of the present invention may be implemented by way of performing the smooth selection in the obtained distorted image through the display screen, or by determining any small area of the image matrix, for example the small area in the upper left corner, as the estimation area of the distortion parameter which is defaulted by system. For the terminal processing system, it is only required to remember the coordinates of the pixels in the selected portion of the distorted image.

During the process of obtaining the image, it is inevitably that the random noise caused by the dark current and photometric factors and the like is superimposed. In order to reduce the effect of the random noise on the obtained distortion parameter and improve the estimation accuracy of the distortion parameter, the noise elimination processing may also be performed for the obtained distorted image in one preferred embodiment of the present invention. Specifically, the elimination of random noise may be performed for the obtained distorted image by using the median filtering method and the like.

Figure 2:
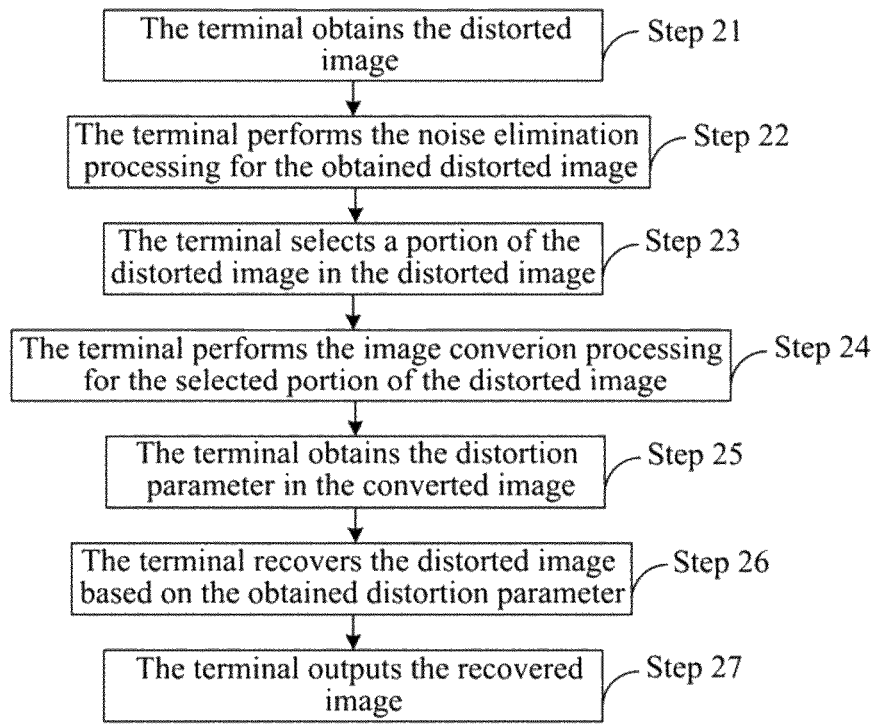
FIG. 2 is a schematic flowchart 2 of method for processing the distorted image provided by the embodiments of the present invention.

An entire embodiment of method for processing the distorted image provided by the embodiment of the present invention is described in detail in combination with FIG. 2 as bellow:

The embodiment specifically includes:

Step 21, a terminal obtains a distorted image.

Step 22, the terminal implements the noise elimination processing for the obtained distorted image.

Step 23, the terminal selects a portion of the image in the distorted image.

Step 24, the terminal implements the image conversion processing for the selected portion of distorted image.

Specifically, the terminal may convert the selected portion of distorted image to a corresponding spectrum domain image.

Alternatively, the terminal may convert the selected portion of distorted image to a corresponding cepstrum domain image.

The specific process of conversion may refer to the above-mentioned description related to the embodiments of the present invention.

Step 25, the terminal obtains the distortion parameter in the converted image.

The process of the obtaining the distortion parameter may refer to the above-mentioned description related to the embodiments of the present invention.

Step 26, the terminal performs the recovery processing on the distorted image based on the obtained distortion parameter.

The process of the recovering the distorted image may refer to the above-mentioned description related to the embodiments of the present invention.

Step 27, the terminal outputs the recovered image.

The terminal may output the recovered image through the display screen, printer and the like.

An apparatus for processing the distorted image is also provided by the embodiment of the present invention, and the apparatus may specifically include an obtaining module 31 and a recovery module 32, wherein:

the obtaining module 31 is configured to obtain the distortion parameter of the distorted image after performing the image conversion processing for the obtained distorted image;

the recovery module 32 is configured to perform the recovery processing on the distorted image based on the distortion parameter obtained by the obtaining module 31.

In one optional embodiment of the present invention, the obtaining module 31 may specifically includes:

a conversion unit 311, configured to perform the image conversion processing for the distorted image;

a parameter obtaining unit 312, configured to obtain the distortion parameter from the corresponding image converted by the conversion unit 311.

In the embodiment of the present invention, the conversion unit 311 may converts the distorted image to a corresponding spectrum domain image. Specifically, the conversion unit 311 may perform the Fourier transform for the distorted image g(x, y) to obtain a corresponding spectrum domain image G(u, v)

In the embodiment of the present invention, the conversion unit 311 may also convert the distorted image to the corresponding cepstrum domain image. The specific process may be as bellow:

Assuming that G(u, v) is the spectrum domain image corresponding to the distorted image g(x, y), transform the G(u, v), let:

$$G\%(u,v) = |\log(1 + |G(u,v)|)|^2;$$

The cepstrum domain image corresponding to the distorted image g(x, y) provided by the embodiment of the present invention may be obtained by performing a two-dimension Inverse Fourier Transform for G %(u, v).

The specific calculation formula may be as the following:

$$Cep(g(x, y)) = \frac{1}{4\pi^2} \int_{-\pi}^{\pi} \int_{-\pi}^{\pi} |G\%(u, v)| e^{j2\pi(ux+vy)} \, du \, dv;$$

In the embodiment of the present invention, the parameter obtaining unit 312 may obtain the distortion parameter specifically in the spectrum domain image corresponding to the distorted image.

In the embodiment of the present invention, the distorted parameters may specifically include the distortion angle θ and the distortion length L.

It can be seen by analyzing the Fourier spectrum domain characteristics of the distorted image that the obvious mutually parallel dim lines with equal space exist in the plane of the spectrum domain image corresponding to the distorted image, and the direction of the dim lines is perpendicular to the distortion direction of the image, and these straight lines with equal space reflect the distortion length L. the distortion angle θ may be concluded from the direction of the straight lines. Thereby the parameter obtaining unit 312 may estimate the distortion parameter based on the spectrum domain image corresponding to the distorted image.

In the embodiment of the present invention, the parameter obtaining unit 312 may also specifically obtain the distortion parameter in the cepstrum domain image corresponding to the distorted image.

Specifically, the parameter obtaining unit 312 may perform Hough transform for the edge image extracted from the cepstrum domain image, that is the binary image BW, to obtain the accumulation array A(ρ,θ) when calculating the distortion angle θ, and find the maximum value of the accumulation array A(ρ,θ), the corresponding θ component of which may be the distortion angle θ of the distorted image g(x, y). The Hough transform expression may specifically be:

ρ=$x_0$ cos θ+$y_0$ sin θ=A sin(α+θ).

The parameter obtaining unit 312 may rotate the cepstrum domain image cep(G(u, v)) by −θ degrees (θ may be the estimated distortion angle) when calculating the distortion angle L to obtain a matrix H, and at this time the distortion direction of the distorted image becomes the horizontal direction; and obtain one row vector avg[ ] by averaging H by column, thereby the two-dimension data is converted into one-dimension data, then the parameter obtaining unit 312 may determine the position of the first negative value of the real part of the avg[ ] in the vector as the distortion length L.

In one preferred embodiment of the present invention, the obtaining module 31 may specifically includes:

a selecting unit 313, configured to select a portion of the distorted image, so that the obtaining module 31 performs the image conversion on the selected portion of the distorted image, and obtain the distortion parameter in the converted corresponding image.

In one alternative embodiment of the present invention, the obtaining module 31 specifically may further include:

a noise elimination unit 314, configured to perform the noise elimination processing on the distorted image obtained by the terminal Specifically, the noise elimination unit 314 may perform the random noise elimination on the obtained distorted image by using the median filtering method and the like.

In the embodiment of the present invention, the recovery module 32 specifically may bring the distortion parameter obtained by the obtaining module 31 into the point spread function formula causing the image distortion, i.e. formula (1), to obtain the frequency domain expression of the point spread function:

$$H(u, v) = \frac{\sin \pi 1 L}{\pi 1 L} e^{-j\pi 1 L};$$

the recovery module 32 obtains the time domain expression of the point spread function by using the Inverse Fourier transform.

Then, the recovery module 32 may recover the distorted image by multiple methods.

In one preferred embodiment of the present invention, the recovery module 32 may recover the distorted image by using the Lucy-Richardson method.

The recovery module 32 may be further configured to output the recovered image.

Figure 3:
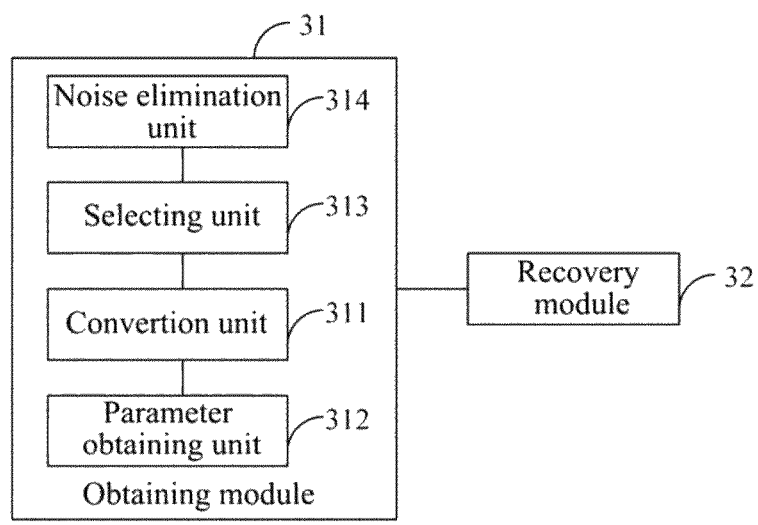
FIG. 3 is a structural schematic diagram of the apparatus for processing the distorted image provided by the embodiments of the present invention.

The schematic diagram of the entire structure of the apparatus for processing the distorted image provided by the embodiment of the present invention may be as shown in FIG. 3.

The method and apparatus for processing the distorted image provided by the embodiment of the present invention obtains the distortion parameter of the distorted image after the terminal performs the image conversion processing for the obtained distortion image; the terminal recovers the distorted image based on the distortion parameter. Thereby a distorted image is ensured to be recovered by terminal to a clear image quickly and accurately, improving the experience of users.

What is described above are only embodiments of the present invention, and it should be noted that those skilled in the art may make several improvements and variations which are considered falling into the protection scope of the present invention without departing from the principle of the present invention.

What is claimed is:

1. A method for processing distorted image, the method comprising:

a terminal converting an obtained distorted image to a corresponding spectrum domain image or a corresponding cepstrum domain image;

wherein:

the step of the terminal converting the distorted image to the corresponding cepstrum domain image comprises:

the terminal performing Fourier transform for a distorted image g(x, y), and obtaining a spectrum domain image G(u, v) corresponding to the distorted image g(x, y);

the terminal performing transformation on the G(u, v) by using a transformation formula G % (u, v)=|log(1+|G(u, v)|)|²;

the terminal performing a two-dimension Inverse Fourier transform for the G % (u, v) to obtain a cepstrum domain image Cep(g(x, y)) corresponding to the distorted image g(x, y);

the terminal performing a distortion parameter of the distorted image based on the spectrum domain image or the cepstrum domain image;

the terminal performing recovery processing for the distorted image based on the distortion parameter.

2. The method according to claim 1, wherein:
the step of the terminal performing the image conversion processing for the obtained distorted image comprises:
the terminal performing the image conversion processing for a selected partial area of the distorted image.

3. The method according to claim 1, wherein:
the step of the terminal obtaining the distortion parameter based on the cepstrum domain image comprises:
the terminal extracting an edge image of the cepstrum domain image to obtain a binary image;
the terminal performing Hough transform for the binary image to obtain an accumulation array $A(\rho,\theta)$, a formula of the Hough transform being $\rho = x_0 \cos\theta + y_0 \sin\theta = A \sin(\alpha+\theta)$; wherein $x_0$ and $y_0$ are coordinate parameters of pixels in the binary image;
the terminal determining an angle $\theta$ component corresponding to the accumulation array $A(\rho,\theta)$ with a maximum value as a distortion angle in the distortion parameters.

4. The method according to claim 1, wherein:
the step of the terminal obtaining the distortion parameter based on the cepstrum domain image comprises:
the terminal rotating the cepstrum domain image by a negative distortion angle in the distortion parameters to obtain a two-dimension image matrix;
the terminal averaging the two-dimension image matrix by column to obtain a row vector;
the terminal determining a position of a first negative value of real part of the row vector in the vector as a distortion length in the distortion parameters.

5. An apparatus for processing distorted image, the apparatus comprising at least one processor, which functions as:
an obtaining module, configured to obtain a distortion parameter of the distorted image after performing image conversion processing for obtained distorted image;
a recovery module, configured to perform recovery processing for the distorted image based on the distortion parameter;
wherein the obtaining module comprises:
a conversion unit, configured to perform the image conversion processing for the distorted image, and the image conversion processing comprising converting the distorted image to a corresponding spectrum domain image or a corresponding cepstrum domain image; and
a parameter obtaining unit, configured to obtain the distortion parameter in a corresponding image converted by the conversion unit;
wherein the process of converting the distorted image to the corresponding cepstrum domain image comprises:
the terminal performing Fourier transform for a distorted image $g(x, y)$, and obtaining a spectrum domain image $G(u, v)$ corresponding to the distorted image $g(x, y)$;
the terminal performing transformation on the $G(u, v)$ by using a transformation formula $G\%(u, v) = |\log(1+|G(u, v)|)|^2$;
the terminal performing a two-dimension Inverse Fourier transform for the $G\%(u, v)$ to obtain a cepstrum domain image $Cep(g(x, y))$ corresponding to the distorted image $g(x, y)$.

6. The apparatus according to claim 5, wherein the obtaining module comprises:
a selecting unit, configured to select a portion of distorted image in the distorted image, so that the obtaining module performs the image conversion processing for the portion of distorted image which is selected, and then obtains the distortion parameter of the distorted image.

* * * * *